(12) United States Patent
Yamaguchi et al.

(10) Patent No.: US 6,227,127 B1
(45) Date of Patent: May 8, 2001

(54) FURNACE MATERIAL, HEAT RESISTING PROTECTION TUBE AND PROTECTIVE MEMBER USING THE SAME SINTERED MATERIAL

(75) Inventors: Shinichi Yamaguchi; Yasuhiro Tanaka, both of Kokubu (JP)

(73) Assignee: Kyocera Corporation, Kyoto-Fu (JP)

( * ) Notice: Subject to any disclaimer, the term of this patent is extended or adjusted under 35 U.S.C. 154(b) by 0 days.

(21) Appl. No.: 09/300,648

(22) Filed: Apr. 27, 1999

(30) Foreign Application Priority Data

Apr. 28, 1998 (JP) .................................................. 10-118938
Jun. 30, 1998 (JP) .................................................. 10-185483

(51) Int. Cl.$^7$ .............................. F23M 5/02; F23M 9/00; C04B 35/03; C04B 35/04; C04B 35/47
(52) U.S. Cl. ..................... 110/338; 110/323; 110/336; 501/108; 501/110; 501/100; 501/117
(58) Field of Search ..................... 110/336, 338, 110/339, 323, 324, 325; 202/267; 501/100, 108, 110, 117, 127, 119, 120

(56) References Cited

U.S. PATENT DOCUMENTS

| | | | |
|---|---|---|---|
| 1,439,410 | * 12/1922 | Gray | 110/338 |
| 2,463,217 | * 3/1949 | Tonneson | 72/101 |
| 2,686,655 | * 8/1954 | Schorner | 253/77 |
| 2,829,877 | * 4/1958 | Davis | 263/33 |
| 3,295,280 | * 1/1967 | Kettner | 52/378 |
| 3,379,578 | * 4/1968 | Mctaggart et al. | 136/234 |
| 3,467,542 | * 9/1969 | Nordlie | 117/94 |
| 3,615,775 | * 10/1971 | Teeter | 106/59 |
| 3,663,248 | * 5/1972 | Umeya et al. | 106/58 |
| 4,060,095 | 11/1977 | Kurita . | |
| 4,067,792 | 1/1978 | Semkina et al. . | |
| 4,107,255 | * 8/1978 | Clishem et al. | 264/299 |
| 4,135,538 | 1/1979 | Kurita . | |
| 4,320,612 | * 3/1982 | Jeffries | 52/396 |
| 4,692,419 | * 9/1987 | Matsui et al. | 501/97 |
| 4,692,420 | * 9/1987 | Oda et al. | 501/97 |
| 5,230,565 | 7/1993 | Aoki et al. . | |
| 5,676,540 | * 10/1997 | Williams et al. | 432/247 |
| 5,750,958 | * 5/1998 | Okuda et al. | 219/267 |
| 5,775,269 | * 7/1998 | Lawrence | 122/511 |
| 5,866,491 | * 2/1999 | Unno | 501/127 |

FOREIGN PATENT DOCUMENTS

| | | | |
|---|---|---|---|
| 51-71312 | 6/1976 | (JP) . | |
| 4-94064 | 3/1992 | (JP) | H01M/10/39 |
| 09040453 | 2/1997 | (JP) | C04B/35/043 |
| 10045463 | 2/1998 | (JP) | C04B/35/00 |

* cited by examiner

Primary Examiner—Stephen Gravini
Assistant Examiner—Ken Rinehart
(74) Attorney, Agent, or Firm—Hogan & Hartson, LLP.

(57) ABSTRACT

A sintered material includes a polycrystalline substance of $MgAl_2O_4$ and/or $Al_2O_3$; and 3 to 90 weight percent of $Cr_2O_3$ and/or $CeO_2$. Furnace material, furnace wall block, high temperature protection tube, and high temperature protecting member are made of such sintered material, and have higher heat resistance and corrosion resistance.

13 Claims, 6 Drawing Sheets

FURNACE MATERIAL, HEAT RESISTING PROTECTION TUBE AND PROTECTIVE MEMBER USING THE SAME SINTERED MATERIAL

BACKGROUND OF THE INVENTION

This invention relates to sintered materials, furnace materials, and protection tubes and protecting members which are to be subjected to high temperature.

Conventionally, ashes which remain after garbage is burned in an incinerator have been buried in final disposal fields. However, it has become difficult to secure a site due to strict conditions of location. Further, the detoxification of toxic pollutants such as dioxin and flon has been strictly controlled by laws and regulations. In view of the problems, in recent years, there has been an increasing demand for a furnace for melting collected incineration ash and fly ash to detoxify toxic substances. The ashes left after incineration can be reduced ½ to ¼ in volume by melting them in a furnace at a high temperature. Also, toxic pollutants such as dioxin can be detoxified by pyrolysis in the furnace. Accordingly, such high temperature heat treatment is seen as promising.

In the high temperature heat treatment using a furnace, incineration ash is charged into the furnace and melted at a temperature of 1300 to 1600° C. As the incineration ash is melted, some metallic elements evaporate. These metallic elements are taken out and suddenly cooled by a cooling apparatus. The thus condensed particulates are collected as metallic concentrates by a filter or the like.

On the other hand, toxic substances such as dioxin and flon are thermally broken and released as detoxified gas into the air via a gas treating apparatus. Further, the remains in the furnace are taken out as slagged granules to be effectively utilized or disposed.

For wall block of the furnace is used a refractory wall block which is made of low purity ceramics of the alumina type, magnesia type, chromia type, carbon type or composite of those types having a porosity of about 10 to 20%. The use of such a refractory furnace wall block is designed to prevent the furnace wall block from being damaged by contact with slag, and particularly to prevent a severe damage of a portion of the furnace near a slag outlet or tap opening.

Further, the furnace is provided with a heating member and a thermocouple for temperature measurement inside the furnace. However, because there are molten slag, molten salts, and vapors of incineration ashes inside the furnace, the heating member and the thermocouple are required to be protected from these substances.

A protection tube is usually used to protect the heating member and the thermocouple projecting into the interior of the furnace. Such a protection tube has an U-shaped section, and the open end of the protection tube is held between furnace wall blocks supporting the heating member. The protection tube is made of a ceramic having heat and corrosion resistance. For example, the protection tube is made of a composite ceramic of $MgO-ZrSiO_2-Al_2O_3$, as disclosed in Japanese Unexamined Patent Publication No. SHO 51-71312.

In applying heat treatment to the incineration ash, as described above, the ash is heated and melted at a temperature of 1300 to 1600° C. The protection tube and the furnace wall blocks are exposed to molten slag, which are formed as a result of melting the incineration ash, vapors or the like. Si, Al, Fe, Ca, Na and the like in the molten slag gradually penetrate and corrode into the ceramics forming the protection tube and the furnace materials, consequently changing the properties of the ceramics gradually. This leads to a deteriorated strength, cracks and damages, and partial melting of the protection tube and furnace wall blocks. Accordingly, it has been very difficult to use the protection tube and the furnace wall blocks over a long period of time. This phenomenon has been particularly conspicuous in the outer surface of the bottom of the protection tube.

Further, a part of the vapor components enters through a narrow clearance between the protection tube and the furnace wall blocks holding the protection tube, causing the furnace wall block to change in its properties, and corroding and melting them. A glass component of the molten furnace material deposits on a bottom portion of the protection tube after running down along the heating member, and considerably corrodes the inside of the protection tube. The molten glass corrodes the protection tube at a corrosion rate several times as fast as the corrosion from the outer surface of the protection tube. In a worst case, such corrosion causes a through hole in the bottom wall of the protection tube, considerably shortens the life of the heating member, and gives a fatal damage to the life of the furnace. The problem of molten glass has been crucial.

SUMMARY OF THE INVENTION

It is an object of the present invention to provide a sintered material, high temperature furnace material, and heat resisting protection tube and protecting member which have overcome the problems residing in the prior art.

According to an aspect of the present invention, a sintered material comprises a polycrystalline substance of $MgAl_2O_4$ and/or $Al_2O_3$. Further, 3 to 90 weight percent of $Cr_2O_3$ and/or $CeO_2$ may be preferably added.

High temperature furnace material, and heating resisting protection tube and member are made of the above-mentioned sintered materials, and thus have improved heat resistance and corrosion resistance.

These and other objects, features and advantages of the invention will be more fully understood upon reading the following detailed description in conjunction with the accompanying drawings.

BRIEF DESCRIPTION OF THE DRAWINGS

FIG. 9 is a sectional view showing a protection tube provided with a protecting member on a bottom wall portion thereof.

DETAILED DESCRIPTION OF PREFERRED EMBODIMENTS OF THE INVENTION

The inventors of the present application devoted themselves to their research in view of the above problems and, finally found out that a sintered material having a polycrystalline substance of $MgAl_2O_4$ and/or $Al_2O_3$, and containing 3 to 90 weight percent of $Cr_2O_3$ and/or $CeO_2$ has an excellent heat resistance and corrosion resistance, and a furnace material and a protection tube made of the same can assure a prolonged use of the furnace.

Ceramics for use in furnace wall blocks can be generally divided into two types of ceramic, that is, ceramics containing no oxides (hereinafter, referred to as "non-oxide ceramics") and ceramics containing oxides (hereinafter, referred to as "oxide ceramics").

In the case of non-oxide ceramics containing SiC, $Si_3N_4$ as a main component, when being exposed to temperatures above 1500° C. in an oxidizing atmosphere or in the air, sintering auxiliaries such as Si, Ca and rare earth elements of the ceramics are vitrified and decomposed. Consequently, the ceramics change in their properties, and the heat resistance of the ceramics becomes poor.

In the case of oxide ceramics containing $ZrO_2$ as a main component, the oxide ceramics undergoes a phase transformation upon being exposed to highs temperatures above 1500° C. even when a high purity raw material is used. This results in a reduced strength. In the case of oxide ceramics containing MgO as a main component, the heat resistance and corrosion resistance are both good under particular conditions. However, a very small amount of moisture exists in the atmosphere or in the ash, the ceramics intensely react with the moisture, and form magnesium oxide. Consequently, the corrosion resistance is considerably deteriorated. Therefore, the ceramics are actually unsuitable for a furnace likely to contain moisture.

Further, conventional alumina type ceramics have a short life because they have a large porosity, and thus have an insufficient corrosion resistance against Si, Al, Fe, Ca, and Na components in the slag. Accordingly, such conventional ceramics cannot be used over a long period.

The inventive sintered material has a polycrystalline substance of $MgAl_2O_4$ (or MgO spinel) and/or $Al_2O_3$. Accordingly, the sintered material is an optimal material as furnace material because it has an extremely high melting point of 2000° C. or higher, and thus has stable heat resistance and corrosion resistance even at high temperatures of 1500 to 1600° C.

MgO spinel is a compound which is represented by $MgAl_2O_4$, and obtained by bonding MgO and $Al_2O_3$ at a theoretical constant molar ratio of 1:1 in mole and at a weight ratio of 28.6 to 71.4 in percent by weight.

In accordance with composition ratios of MgO and $Al_2O_3$, the following substances occur: Only polycrystalline substance of $MgAl_2O_4$ exist at the theoretical constant ratio; A dual-phase crystal structure of MgO and $MgAl_2O_4$ exists if a larger amount of MgO is contained than the theoretical constant ratio; A dual-phase crystal structure of $Al_2O_3$ and $MgAl_2O_4$ exists if a larger amount of $Al_2O_3$ is contained than the theoretical constant ratio.

The polycrystalline substance containing $MgAl_2O_4$ and/or $Al_2O_3$ as a main component can have three kinds of crystal structure: (1) a crystal structure of only $MgAl_2O_4$ when containing 28.6 percent by weight of MgO and 71.4 percent by weight of $Al_2O_3$; (2) a dual-phase crystal structure of $MgAl_2O_4$ and $Al_2O_3$ when containing less than 28.6 percent by weight of MgO and greater than 71.4 percent by weight of $Al_2O_3$ and (3) a crystal structure of only $Al_2O_3$ when containing no MgO and 100 percent by weight of $Al_2O_3$. These crystal structures are analyzed by the X-ray diffraction.

Further, the inventive sintered material contains $CeO_2$ and/or $Cr_2O_3$ in addition to the polycrystalline substance of $MgAl_2O_4$ and/or $Al_2O_3$. Accordingly, the inventive sintered material has a reduced wettability against slag and prevents penetration of slag, thereby improving the corrosion resistance. Specifically, the wettability against slag is reduced by adding 3 to 90 percent by weight, preferably 3 to 50 percent by weight, of $Cr_2O_3$ and/or $CeO_2$ to the sintered material, thereby causing them to exist in the grain boundary. Accordingly, the addition of $Cr_2O_3$ and/or $CeO_2$ prevents penetration of slag, and improves the corrosion resistance.

The inventive sintered material is produced at a sintering temperature of 1600 to 1750° C., preferably a temperature of 1700 to 1750° C. The sintering time is preferably 2 to 10 hours at this temperature. In these conditions, the grain size can grow larger, and the corrosion resistance can be further improved.

The inventive sintered material has a high melting point, a high temperature stability and excellent heat and corrosion resistances owing to the polycrystalline substance of MgO spinel and/or $Al_2O_3$. Further, the inventive sintered material contains $Cr_2O_3$ and/or $CeO_2$. Accordingly, a furnace wall block made of the inventive sintered material has a reduced wettability against slag, and is resistant against the penetration and corrosion of corrosive elements contained in the molten slag and salts.

Below will be described an embodiment of a furnace constructed by wall blocks including an inventive sintered material and a protection tube and protecting member including an inventive sintered material.

Figure 1:
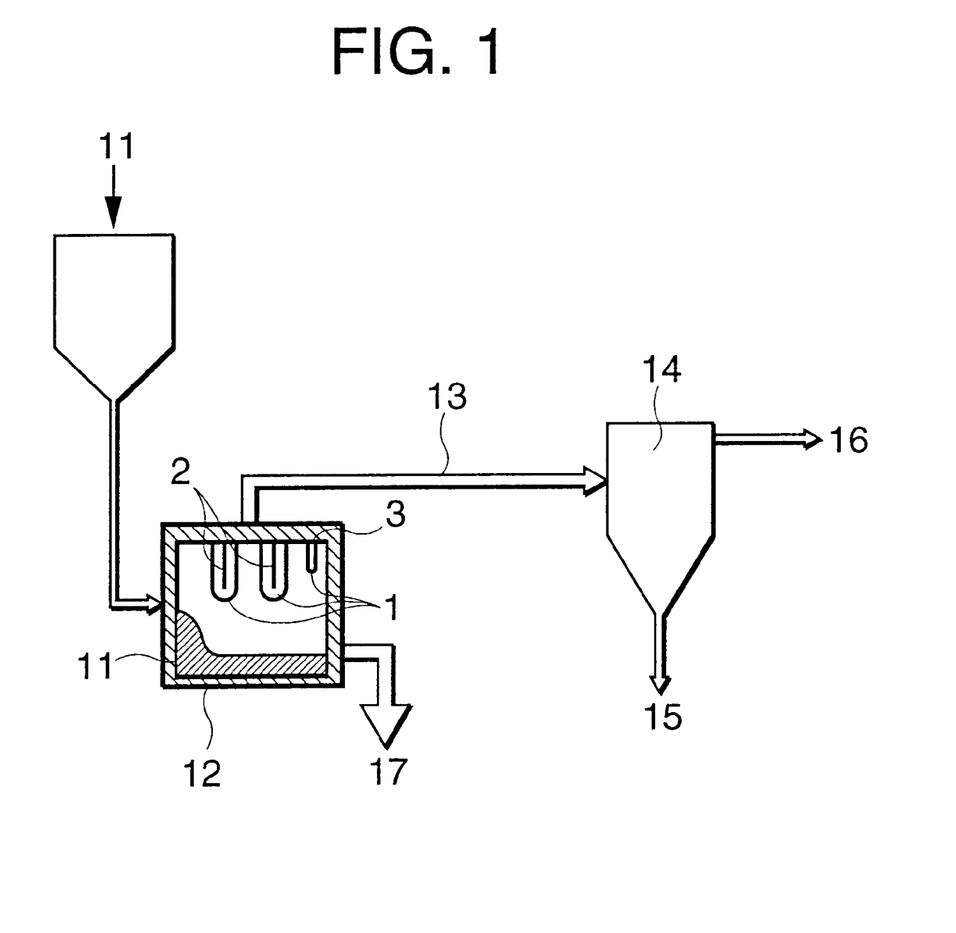
FIG. 1 is a schematic diagram showing a construction of an incineration ash melting furnace embodying the invention.

FIG. 1 schematically shows a construction of an incineration ash melting furnace system. The incineration ash melting furnace system mainly includes a furnace 12 and a filtering unit 14. The furnace 12 is provided with heating members 2, a thermocouple 3, and protection tubes 1 for enclosing the heating members 2 and the thermocouple 3, respectively. Incineration ash 11 is charged in the furnace 12, and heated by the heating members 2 into molten slag 17, vapor of metallic elements and various gases 13. Toxic gases are thermally broken into non-harmful gases in the furnace 12. The molten slag 17 is discharged from a bottom of the furnace 12. The vapor of metallic elements and other gases 13 are transferred to the filtering unit 14 where metallic elements 15 are recovered in the form of particles and detoxified gases 16 are released into the air.

Figure 2:
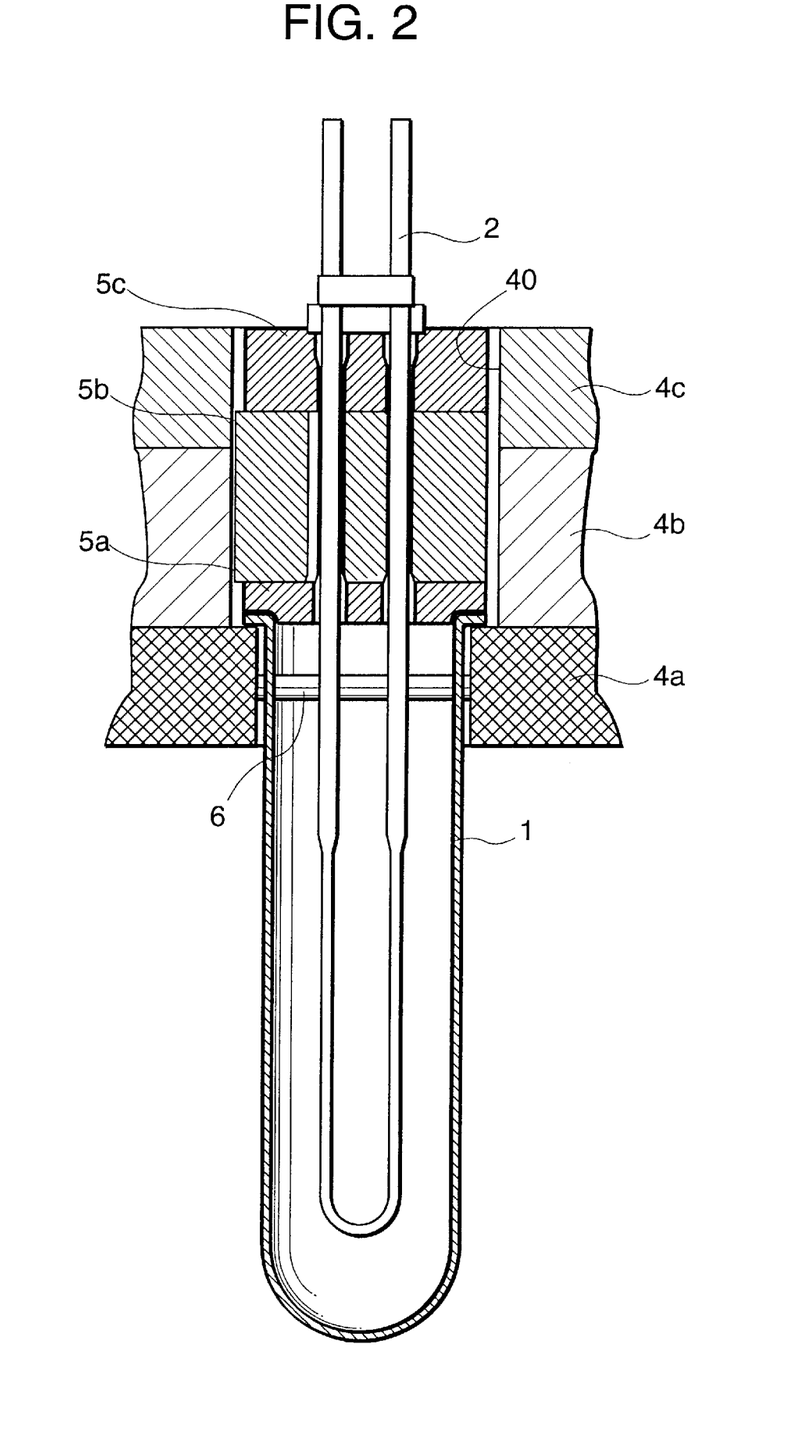
FIG. 2 is an enlarged sectional view showing an arrangement of a heating member and a protection tube in the furnace.

FIG. 2 shows an attachment construction of the heating member 2 and the protection tube 1 on a wall of furnace 12. The furnace wall is constructed by three types of blocks 4a, 4b, 4c. A through hole 40 is formed in a specified position of the furnace wall. The heating member 2 is placed in the through hole 40, a heating portion of the heating member 2 projecting in the interior of the furnace 12. The heating member 2 is supported by supporting blocks 5a, 5b, 5c. The protection tube 1 has a U-shaped section and a space for accommodating the heating member 2. The open end of the protection tube 1 has a flange. The protection tube 1 is fixedly attached on the furnace wall by holding the flange between the wall block 4a and the supporting block 5a. Further, a rod 6 is transversally placed in the hole 40 formed in the wall block 4a to keep the diameter of the hole 40a even when the wall block 4a is deformed by heat, thereby preventing the protection tube 1 from being damaged by the wall block 4a, and also facilitating replacement of protection tube.

Figure 3A:
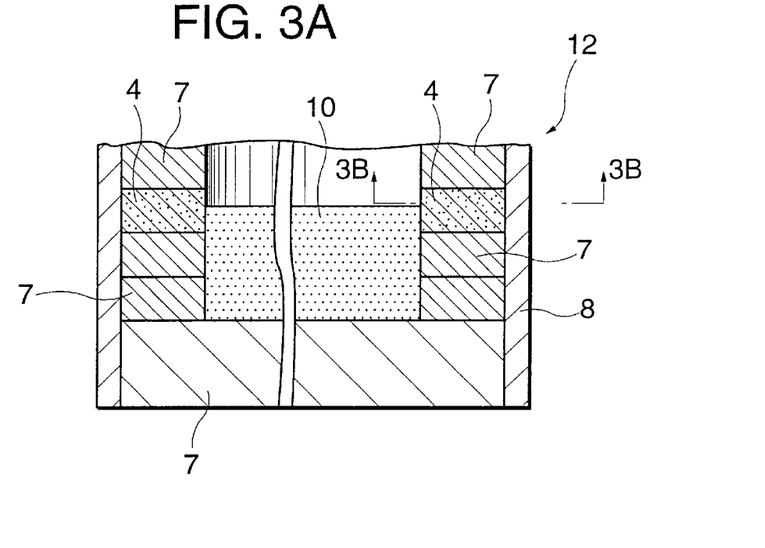
FIG. 3A is a sectional view showing a lower portion of the incineration ash melting furnace.
Figure 3B:
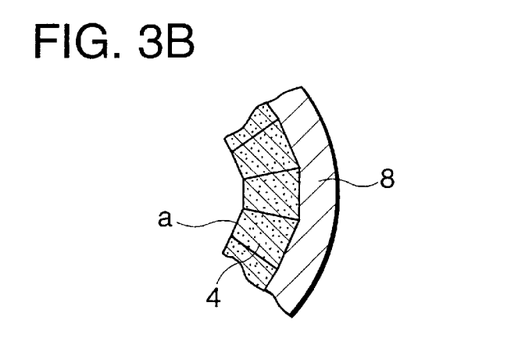
FIG. 3B is a partially sectional view taken along the line 3B—3B in FIG. 3A.
Figure 4:
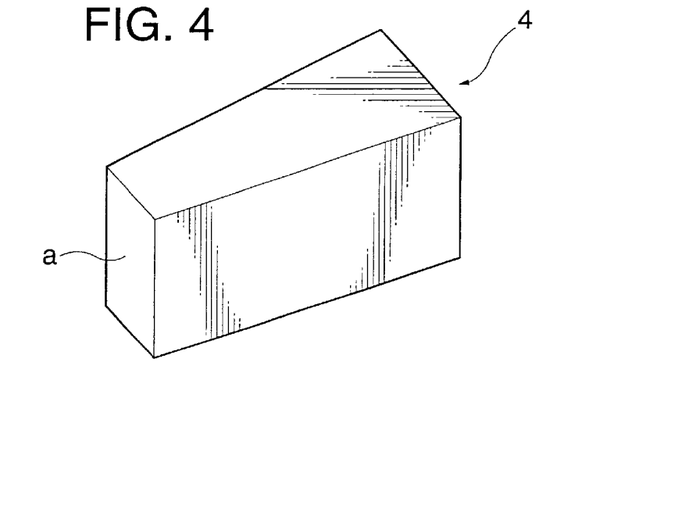
FIG. 4 is a perspective view showing a wall block used in the incineration ash melting furnace.

FIG. 3A is a vertical sectional view of the furnace 12, showing a lower portion of the furnace 12. FIG. 3B is a sectional view taken along the line 3B—3B in FIG. 3A. FIG. 4 is an enlarged perspective view showing a wall block used in the furnace 12.

The furnace 12 is constructed by a multitude of furnace wall blocks 4 and 7 placed one on another, and an outer wall member 8 for fixedly holding the wall blocks. The wall blocks 4 are made of an inventive sintered material while the wall blocks 7 are made of conventional sintered materials, such as alumina type ceramic. The outer wall member 8 is made of a metallic material, e.g., construction steel, or heat resisting steel.

In this embodiment, the layer of the furnace wall blocks 4 is arranged at a surface level of the molten slag in the furnace 12 because the portion coming into contact with the slag surface is likely to be severely damaged. Also, the slag outlet portion or tapping portion may be preferably constructed by wall blocks 4 of the inventive sintered material because of the severe damage likelihood. The other portions are constructed of the conventional blocks 7. However, all the portions of the furnace 12 may be constructed by wall blocks 4 made of the inventive sintered material.

Figure 5:
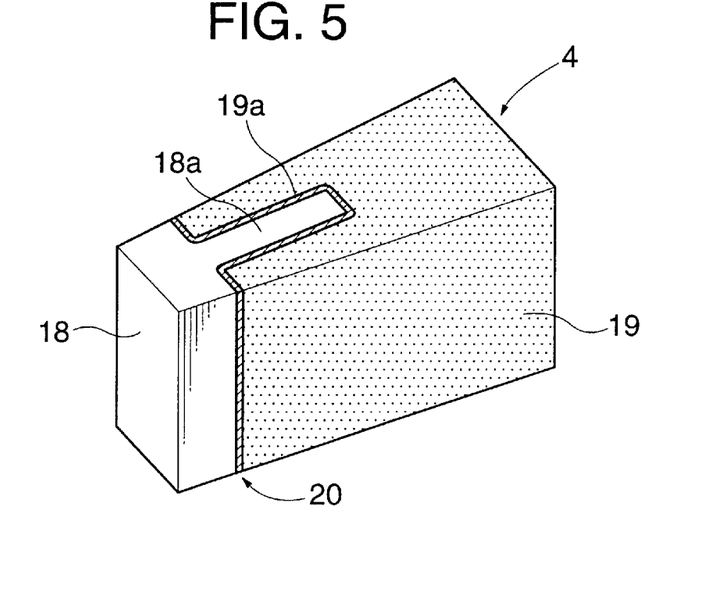
FIG. 5 is a perspective view showing a modified furnace wall block.
Figure 6A:
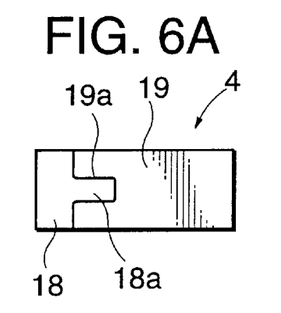
FIGS. 6A to 6F are plan view showing another modified furnace wall blocks, respectively.
Figure 6B:
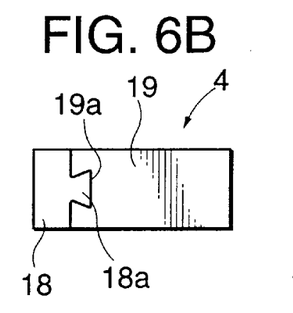
Figure 6C:
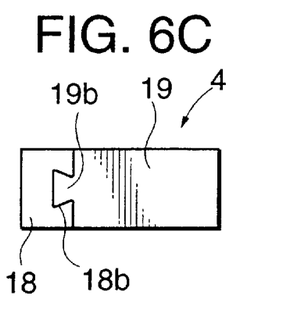
Figure 6D:
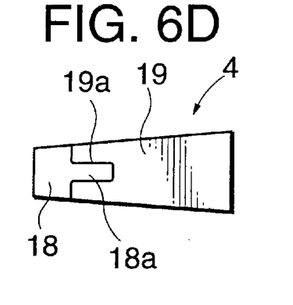
Figure 6E:
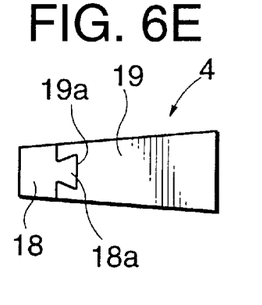
Figure 6F:
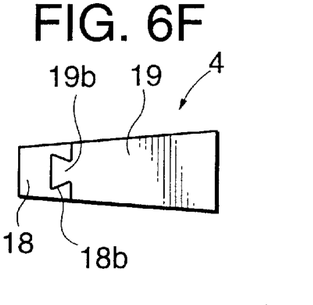
Figure 7:
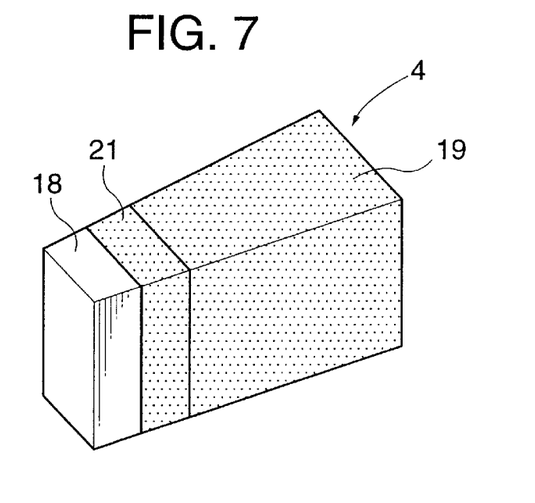
FIG. 7 is a perspective view showing still another modified furnace wall block.

FIGS. 5 to 7 show modified furnace wall blocks. The modified furnace wall block 4 has an inner member 18 made of an inventive sintered material having a porosity of 3 percent or lower and an outer member 19 made of a porous sintered material having a porosity of 10 to 20 percent. The inner member 18 is arranged in an inner side of the furnace where it comes into direct contact with molten slag, while the outer member 19 is arranged in an outer side of the furnace where to come into no contact with molten slag.

The modified furnace wall block 4 has an improved corrosion resistance because the dense sintered material is arranged in the inner side to be brought to come into contact with molten slag, and an improved thermal shock resistance because the porous sintered material is arranged in the outer side to be brought to come into no contact with molten slag. Also, the modified furnace wall block 4 has a reduced weight because of the provision of the porous sintered material.

The upper limit of 3 percent or lower for the porosity of the inner member material 18 is provided because of the fact that in the case of a sintered material having a porosity of more than 3 percent, corrosive elements are liable to enter pores of the sintered material and the necessary corrosion resistance cannot thus be assured. The range of 10 to 20 percent for the porosity of the outer member material 19 is provided because of the fact that in the case of a sintered material having a porosity of lower than 10 percent, the thermal shock resistance considerably decreases, and in the case of a sintered material having a porosity of greater than 20 percent, the strength and the corrosion resistance noticeably decreases.

The size of the furnace wall block 4 is set at a width of 50 to 100 mm, a height of 100 to 200 mm, and a thickness of 200 to 300 mm. The furnace wall block 4 may be shaped into a variety of shapes, such as rectangle, fan-shape, castable undefined shape.

However, the thermal shock resistance of the dense sintered material decreases as the size becomes larger. Accordingly, the inner member 18 of the dense sintered material is preferably dimensioned such that the width is 40 to 60 mm, the height is 100 to 200 mm, and the thickness is 40 mm or less.

Particularly, it should be noted to the aspect of thickness of the inner member 18 made of the dense sintered material. The corrosion resistance is increased by increasing the thickness. However, the thermal shock resistance decreases as the thickness increases. Also, in the case of the thickness exceeding 40 mm, the sintering becomes difficult, and a uniform sintered material cannot be produced. Accordingly, the thickness is preferably 40 mm or less. On the other hand, although the thermal shock resistance is better as the thickness is less, the life becomes shorter due to the corrosion as the thickness is decreased. In view of this point, the thickness of the inner member 18 made of the dense sintered material is more preferably set in a range of 10 to 30 mm.

Referring to FIG. 5 showing a modified furnace wall block 4, more specifically, the inner member 18 made of the dense sintered material is formed with a projection 18a while the outer member 19 made of the porous sintered material is formed with a recess 19a. The inner member 18 and the outer member 19 are fixedly combined with each other by placing the projection 18a in the recess 19a, and placing heat resistive inorganic adhesive 20 between the inner member 18 and the outer member 19. The first modified furnace wall block 4 has the general shape of a prism having a trapezoidal horizontal section. The inner member 18 is arranged at a narrower side of the furnace block 4.

FIGS. 6A to 6F show another modified furnace wall blocks including the inventive sintered material. In these modified furnace wall blocks, as shown in FIGS. 6A to 6C, the horizontal section may be shaped into a rectangle. As shown in FIGS. 6C to 6F, the horizontal section may be shaped into a trapezoid, similarly to the block shown in FIG. 5. Also, an engagement projection 19a may be formed in the inner member made of the dense sintered material while an engagement recess 19a in the outer member 19 made of the porous sintered material, as shown in FIGS. 6A, 6B, 6D, and 6E. Further, an engagement projection 19b may be formed in the outer member 19 made of the porous sintered material while an engagement recess 18b in the inner member made of the dense sintered material, as shown in FIGS. 6C and 6F. The shape of engagement projection and engagement recess may be formed into a rectangle, a trapezoid, or the like.

The engagement of the inner member 18 and the outer member 19 may be accomplished by the use of heat resistive inorganic adhesive as well as a mechanical engagement. As heat resistive inorganic adhesive, an alumina type inorganic adhesive or the like is used. The heat resistive inorganic adhesive serves as a stress relaxing layer against thermal shock. In other words, if the inner member 18 made of the dense sintered material is subjected to a thermal shock exceeding a permissible value of the dense sintered material, some cracks occur in the dense sintered material. However, since the inorganic adhesive acts as a stress relaxing layer, the damage caused by the thermal shock will not extend to the outer member 19 made of the porous sintered material. This can prevent the molten slag from leaking from the furnace.

FIG. 7 shows still another modified furnace wall block. This block is provided with an intermediate member 21 made of a sintered material having a porosity between that of the dense sintered material constituting the inner member 18 and that of the porous sintered material constituting the outer member 19, thereby gradually changing the porosity.

The furnace wall block of FIG. 7 is produced by applying a ceramic slurry to one side surface of the outer member 19 of the porous sintered material formed in advance, causing the ceramic slurry to impregnate the outer member 19, and sintering the resulting member to thereby form the outer member 19 attached with the intermediate member 21. Alternatively, separately formed dense inner member 18 and porous outer member 19 are joined by an inorganic adhesive layer which is so adjusted as to have a porosity between that of the dense sintered material constituting the inner member 18 and that of the porous sintered material constituting the outer member 19 so that the adhesive layer serves as the intermediate member 21.

Figure 8:
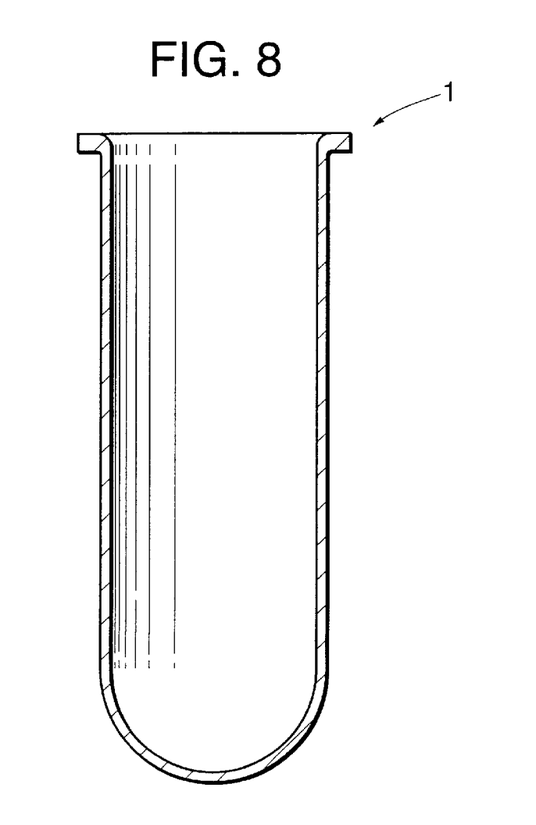
FIG. 8 is a sectional view showing a protection tube used in the incineration ash melting furnace.

FIG. 8 shows a protection tube made of an inventive sintered material. The protection tube 1 is attached to the furnace to protect the heating member 2 and the thermocouple 3 from the molten slag and the vaporized components. The protection tube 1 has a cylindrical wall and a closed end wall opposite to an opening to define an accommodation space for accommodating the heating member 2 or the thermocouple 3. The protection tube 1, which is made of the inventive sintered material, has a reduced wettability against slag, and can thus prevent penetration of slag and have a higher corrosion resistance.

FIG. 9 shows another protection tube. This protection tube 1 is made of conventional ceramics, but is provided with a corrosion resistance protecting member 22 on an inner surface of the portion of the tube 1 that is brought in a lowest position when being attached to the furnace. The protecting member 22 provided at the lowest position receives molten glass components dripped from the furnace wall block, thereby keeping the molten glass components from flowing over the inner surface of the protection tube 1 so that the inner surface of the protection tube 1 is free of corrosion.

The protecting member 22 is made of ceramics including a polycrystalline substance of $MgAl_2O_4$ and/or $Al_2O_3$. The ceramics including a polycrystalline substance of $MgAl_2O_4$ and/or $Al_2O_3$ have the good heat resistance and corrosion resistance as mentioned earlier.

Also, it is preferable that the outer surface of the protecting member 22 is unworked to have a sintered surface. This is a result of a study which was conducted to find out a relationship between the surface state of ceramics and corrosion resistance by changing the surface state of the ceramics in various manners. This study found out that corrosion resistance is better when the outer surface of ceramics is unworked to remain sintered than it is ground or lapped. The unworked surface or sintered surface refers to the surface of sintered ceramics which no processing or machining is applied to. The unworked surface has a better corrosion resistance than a worked surface for the following reasons:

A) There are fewer voids in the unworked surface of ceramics than the inside of the ceramics. In other words, if voids exist, corrosive components penetrate into the ceramics. If the surface of the ceramics, which is to be brought into contact with corrosive components, is left unworked, the number of voids is smaller and the penetration of corrosive components can be suppressed to a minimum level. If the unworked surface is eliminated by machining the surface, the voids inside the ceramics come to the outer surface, making the corrosion resistance likely to be interior inferior.

B) The larger the grain size of ceramics is, the better the corrosion resistance is. In oxide ceramics, the grain size is larger at the outer surface of the ceramic than inside of the ceramics. Accordingly, if the outer surface of the protecting member 22 made of the ceramics is unworked, the surface of the protecting member 22 where the grain size is at maximum is brought into contact with corrosive components. Therefore, this is advantageous in terms of corrosion resistance.

C) Application of grinding and lapping to ceramics is likely to damage the outer surface of the ceramics, causing very fine microcracks. If the worked surface of ceramics is placed at a position to be brought into contact with corrosive components, corrosive components are more liable to penetrate into the ceramics though the microcracks.

Further, the use of the ceramic protecting member 22 having the unworked surface can eliminate the conventional machining such as grinding and lapping, thereby simplifying the production process, and reducing the production costs considerably.

To cause larger crystals to grow in a surface, it is better to sinter the ceramics at a temperature higher than the ceramic densifying temperature. Specifically, it is preferable to sinter the ceramics at a temperature 50 to 100° C. higher than the ceramic densifying temperature for 2 hours or longer. The outer surface of the ceramics thus obtained, constituting the protecting member 22, has large crystals of 10 to 20 $\mu$m, and is free from voids.

The protecting member 22 is detachable from the main body of the protection tube 1. This enables replacement of a used and corroded protecting member with a new protecting member when the operation of the furnace is suspended for maintenance inspection or repair, eliminating the necessity of replacing the entire protection tube, thus ensuring a reduced running cost of the furnace.

As described above, if furnace wall blocks holding the heating member 2 are corroded and glass components drip along the heating member 2, the glass components are first received by the protecting member 22, thereby preventing them from coming into contact with the bottom wall portion of the main body of the protection tube 1. This can prevent the bottom wall portion of the main body of the protection tube 1 from being directly and considerably corroded. Further, even if the thickness t of the main body of the protection tube 1 is reduced due to considerable corrosion from the outside, and a through hole consequently occurs in the bottom wall portion, neither the heating member 2 nor the thermocouple 3 are immediately damaged by slag vapors owing to the presence of the protecting member 22.

Although it is better to make the thickness of the main body of the protection tube 1 and the protecting member 22 thinner in view of the thermal shock resistance, thermal efficiency and other factors, their thickness is set in a range of 3 to 20 mm in consideration of the protecting ability and ease to manufacture in this embodiment. Further, it is preferable to set the thickness of the main body of the protection tube 1 in a range of 6 to 12 mm.

Figure 10A:
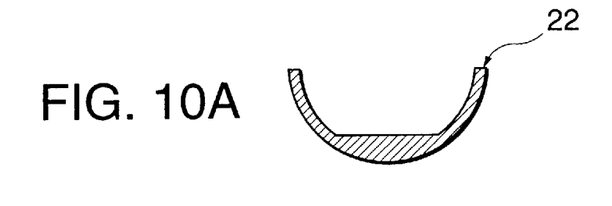
FIGS. 10A to 10C are sectional views showing modified protecting members, respectively.
Figure 10B:
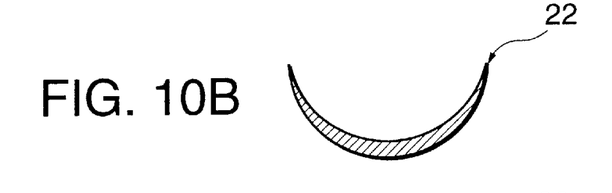
Figure 10C:
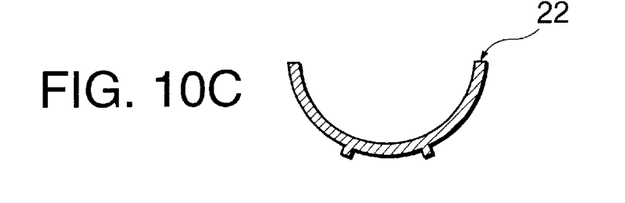

The shape shown in FIG. 9 is usually adaptable for the protecting member 5. However, the shapes shown in FIGS. 10A to 10C are adaptable. Specifically, the shape shown in FIG. 10A is such that a bottom portion likely to be corroded is locally thickened. The shape shown in FIG. 10A is effective for the following case. Usually, the molten glass components from furnace wall blocks for holding the heating member 2 deposit in the bottom portion of the protection tube 1 after dripping down along the heating member 2. There is possibly a case that the molten glass components drip along the inner surface of the protection tube 1. In this case, the protecting member 22 shown in FIG. 10B is effective because of keeping the molten glass components from entering a gap between the protection tube 1 and the protecting member 22. The shape shown in FIG. 10C is an example which facilitates the replacement of protecting member 22, and has a reduced contact area of the protecting member 22 with the protection tube 1.

Although specific examples are described and illustrated above, the shape of the protecting member 22 is not limited thereto. Any shape may be adopted besides the shapes of FIGS. 9, and 10A to 10C provided that it has such a size as to be accommodated in the bottom wall portion of the protection tube 1, can store the glass components dripping along the heating member 2, and can block a corrosive gas inside the furnace when a through hole is formed in the bottom wall portion of the protection tube 1 by the external corrosion.

Although it does not matter whether or not the protecting member 22 is adhered to the protection tube 1, replacement can be seen to be easier if the protecting member 22 is made detachable without being adhered.

The protection tube 1 provided with the protecting member 22 can be stably used for a long period since it has a better corrosion resistance than the conventional protection tubes. The protection tube may be used as a protection tube for a heating member and a variety of sensors, not only in the incineration ash melting furnace, but also in various furnaces including a metal smelting furnace and an arc furnace.

Next will be described examples which were conducted to show the advantageous effects and characteristics of the inventive sintered materials, furnace wall blocks, protection tube, and protecting member.

EXAMPLE 1

Assuming the environment of incineration ash inside a furnace, furnace materials were made from various ceramic materials and reaction tests of these furnace materials with the incineration ash were conducted.

Ash containing Al, Ca, Mg, Na, K, Zn, Pb, Si, Fe, Cl, etc. as its components was collected from an incinerator, and tablets having a diameter of 12 mm, a thickness of 1 mm and a weight of 0.3 g were produced using a dry pressure forming machine.

Subsequently, the mixing composition of MgO and $Al_2O_3$ was specified in percent by weight as shown in TABLE-1, and $Cr_2O_3$ and/or $CeO_2$ were added in specified percents by weight to the entire sintered material. The resulting material went through a dry pressure forming treatment and was sintered at temperatures of 1600 to 1750° C., thereby fabricating tablet test pieces having a diameter of 30 mm and a thickness of 10 mm as Sample Nos. 1 to 5. Sample No. 6 is made from a ceramic containing zirconia, Sample No. 7 of a ceramic containing silicon carbide, and Sample No. 8 of a ceramic containing silicon nitride.

TABLE 1

| Sample No. | Weight Ratio of MgO/ $Al_2O_3$ | Addition [wt %] | Crystal Phase | Glass Phase [wt %] | Grain Size [μm] | Bulk Specific Gravity | Porosity [%] |
|---|---|---|---|---|---|---|---|
| 1 | 61/39 | — | S + P | 0.4 | 5 | 3.49 | 0.1 |
| 2 | 44/56 | — | S + P | 0.4 | 6 | 3.49 | 0.1 |
| 3 | 33/67 | — | S + P | 0.4 | 16 | 3.48 | 0.0 |
| 4 | 28.6/71.4 | $Cr_2O_3$ [50] | S | 1.5 | 12 | 3.15 | 26 |
| 5 | 28.6/71.4 | $CeO_2$ [50] | S | 1.5 | 15 | 5.04 | 5 |
| 6 | $ZrO_2$ | — | — | 4 | 99 | 6.00 | 0.0 |
| 7 | α-SiC | — | — | 4 | 55 | 3.20 | 0.0 |
| 8 | $Si_3N_4$ | — | — | 10 | 60 | 3.20 | 0.0 |

Cavities having a diameter of 13 mm and a depth of 1 mm for placing incineration ash tablets were formed in the respective samples, and a variety of characteristics were then measured as follows.

The crystal phase was analyzed by an X-ray diffraction apparatus under conditions of a voltage of 50 kV and a current of 200 mA set by using a copper tube and with a full scale of $3 \times 10^4$ to $10 \times 10^4$ cps in a measurement range $2\theta$ (=10 to 90°). In TABLE-1, main peaks of $MgAl_2O_4$, $Al_2O_3$, and MgO are indicated at S, C, and P, respectively.

Impurities existed in the form of a glass phase containing $SiO_2$, CaO, $Na_2O$, and $Fe_2O_3$, and were quantitatively analyzed by the ICP analysis.

An SEM picture of a fracture plane was obtained with a magnifying power of 500 to 1000, and the grain size was measured by the Code method using the obtained picture. Further, the bulk specific gravity and porosity were measured in accordance with the JIS methods. These measurement results are also shown in TABLE-1.

Flexural strength of the respective samples, and whether or not the respective samples had melted or cracked were measured, and reaction tests were conducted. Flexural strength (3 points) was measured in accordance with the JIS method. Further, a collective estimation was made based on the measurement and test results. These are shown in TABLE-2.

TABLE 2

| Sample No. | Flexural Strength kgf/mm² | Melting or Crack | Reaction Layer | Estimation |
|---|---|---|---|---|
| 1 | 16 | ○ | x | x |
| 2 | 17 | ○ | x | x |
| 3 | 16 | ○ | x | x |
| 4 | 12 | ○ | ○ | ○ |
| 5 | 15 | ○ | ○ | ○ |
| 6 | 99 | x | — | x |
| 7 | 55 | x | — | x |
| 8 | 60 | x | — | x |

The reaction test was conducted as follows. Tablets of incineration ash were placed in the cavity formed in the ceramic test pieces as samples, and a heat treatment was applied thereto in the air at 1550° C. for 50 hours. Thereafter, the outer appearance of the respective test pieces was observed by the eye and whether or not the test pieces had melted or cracked was checked. As for the cracks, the check was made by cutting the test piece, grinding the cut surface thereof and checking a SEM picture (with a magnifying power of about 50 to 200) of the ground surface. In TABLE-2, cases where the test piece was found to be cracked or melted were indicated at x, and cases where it was found to be neither cracked nor melted were indicated at O.

Further, using a dispersion type EPMA analyzer, the respective elements of Si, Fe, Ca, Na, K were detected at an acceleration voltage of 15 kV and a probe current of $2.0 \times 10^{-7}$ A, and the detection results were outputted in a mapping format. Thereafter, the diffusion depths (reaction layers) of these elements were examined. The test pieces having a reaction layer of 1 mm or thinner are indicated at O and those having a reaction layer thicker than 1 mm are indicated at x.

In the comprehensive estimation, the test pieces which have a very thin reaction layer but can be used in practice are indicated at O, and the test pieces which are considerably deteriorated and cannot be used in practice are indicated at x.

The above results confirm that Sample Nos. 1 to 5, had neither melted nor cracked. In Sample Nos. 1 to 3, however, the reaction layer was thicker than 1 mm. In Sample No. 4 with added $Cr_2O_2$ and Sample No. 5 with added with $CeO_2$, particularly, the reaction layer was thinner and, accordingly, the corrosion resistance can be seen to be improved.

Contrary to this, Sample Nos. 6, 7, and 8 containing $ZrO_2$, SiC, and $Si_3N_4$, respectively can be seen to be unsuitable as furnace material since they had melted or cracked.

EXAMPLE 2

Sample Nos. 9 to 11 were fabricated under the same conditions as in EXAMPLE 1 except that $TiO_2$, NiO, or $La_2O_3$ were used as seen in TABLE-3 instead of $Cr_2O_3$ or $CeO_2$ added to Sample Nos. 4 and 5 of EXAMPLE 1.

TABLE 3

| Sample No. | Weight Ratio of MgO/$Al_2O_3$ | Addition [wt %] | Crystal Phase | Glass Phase [wt %] | Grain Size [μm] | Bulk Specific Gravity | Porosity [%] |
|---|---|---|---|---|---|---|---|
| 4 | 28.6/71.4 | $Cr_2O_3$[50] | S | 1.5 | 12 | 3.15 | 26 |
| 5 | 28.6/71.4 | $CeO_2$[50] | S | 1.5 | 15 | 5.04 | 5 |
| 9 | 28.6/71.4 | $TiO_2$[50] | S | 1 | 13 | 3.05 | 11 |
| 10 | 28.6/71.4 | NiO[50] | S | 1 | 11 | 4.91 | 13 |
| 11 | 28.6/71.4 | $La_2O_3$[50] | S | 1 | 10 | 4.70 | 10 |

Flexural strength and other factors were measured for the respective samples in the similar manners, and results as shown in TABLE-4 were obtained.

TABLE 4

| Sample No. | Flexural Strength Kgf/mm² | Melting or Crack | Reaction Layer | Estimation |
|---|---|---|---|---|
| 4 | 12 | o | o | o |
| 5 | 15 | o | o | o |
| 9 | 10 | x | x | x |
| 10 | 9 | o | x | x |
| 11 | 11 | x | x | x |

As is clear from TABLE-4, Sample Nos. 4 and 5 can be seen have better heat and corrosion resistances by adding $Cr_2O_3$ or $CeO_2$.

EXAMPLE 3

Sample Nos. 12 to 16 were fabricated under the same conditions as in EXAMPLE 1 except that $TiO_2$, NiO, or $La_2O_3$ were used as well as $Cr_2O_3$ or $CeO_2$ as shown in TABLE-5.

TABLE 5

| Sample No. | Weight Ratio of MgO/$Al_2O_3$ | Addition [wt %] | Crystal Phase | Glass Phase [wt %] | Grain Size [μm] | Bulk Specific Gravity | Porosity [%] |
|---|---|---|---|---|---|---|---|
| 12 | 25/75 | $Cr_2O_3$[50] | S + C | 1.5 | 12 | 3.30 | 25 |
| 13 | 25/75 | $CeO_2$[50] | S + C | 1.5 | 14 | 5.00 | 4 |
| 14 | 25/75 | $TiO_2$[50] | S + C | 1 | 13 | 3.01 | 12 |
| 15 | 25/75 | NiO[50] | S + C | 1 | 10 | 4.97 | 10 |
| 16 | 25/75 | $La_2O_3$[50] | S + C | 1 | 11 | 4.65 | 11 |

Flexural strength and other factors were measured for the respective samples in the similar manners, and results as shown in TABLE-6 were obtained.

TABLE 6

| Sample No. | Flexural Strength kgf/mm² | Melting or Crack | Reaction Layer | Estimation |
|---|---|---|---|---|
| 12 | 13 | o | o | o |
| 13 | 15 | o | o | o |
| 14 | 12 | x | x | x |
| 15 | 12 | o | x | x |
| 16 | 11 | x | x | x |

As is clear from TABLE-6, Sample Nos. 12 and 13 can be seen to have better heat and corrosion resistances by adding $Cr_2O_3$ or $CeO_2$.

EXAMPLE 4

Sample Nos. 17 to 21 were fabricated under the same conditions as in EXAMPLE 1 except that $TiO_2$, NiO, or $La_2O_3$ were used as well as $Cr_2O_3$ or $CeO_2$ as shown in TABLE-7.

TABLE 7

| Sample No. | Weight Ratio of MgO/$Al_2O_3$ | Addition [wt %] | Crystal Phase | Glass Phase [wt %] | Grain Size [μm] | Bulk Specific Gravity | Porosity [%] |
|---|---|---|---|---|---|---|---|
| 17 | 0/100 | $Cr_2O_3$[50] | C | 1.5 | 30 | 3.21 | 25 |
| 18 | 0/100 | $CeO_2$[50] | C | 1.5 | 28 | 4.95 | 9 |
| 19 | 0/100 | $TiO_2$[50] | C | 1 | 26 | 3.55 | 16 |
| 20 | 0/100 | NiO[50] | C | 1 | 25 | 4.50 | 12 |
| 21 | 0/100 | $La_2O_3$[50] | C | 1 | 27 | 4.32 | 10 |

Flexural strength and other factors were measured for the respective samples in the similar manners, and results as shown in TABLE-8 were obtained.

TABLE 8

| Sample No. | Flexural Strength kgf/mm² | Melting or Crack | Reaction Layer | Estimation |
|---|---|---|---|---|
| 17 | 43 | o | o | o |
| 18 | 46 | o | o | o |
| 19 | 41 | x | x | x |
| 20 | 41 | o | x | x |
| 21 | 44 | x | x | x |

As is clear from TABLE-8, Sample Nos. 17 and 18 can be seen to have better heat and corrosion resistances by adding $Cr_2O_3$ or $CeO_2$.

EXAMPLE 5

Sample Nos. 22 to 30 were fabricated by changing the additional amount of $Cr_2O_3$ of Sample No. 4 in various ways, and the heat and corrosion resistances were measured in the similar manners. Obtained results are shown in TABLE-9.

TABLE 9

| Sample No. | Weight Ratio of MgO/Al$_2$O$_3$ | Addition [wt %] | Porosity [%] | Melting or Crack | Reaction Layer | Estimation |
|---|---|---|---|---|---|---|
| 22 | 28.6/71.4 | — | 0.0 | O | x | x |
| 23 | 28.6/71.4 | Cr$_2$O$_3$[3] | 0.2 | O | O | O |
| 24 | 28.6/71.4 | Cr$_2$O$_3$[5] | 1.4 | O | O | O |
| 25 | 28.6/71.4 | Cr$_2$O$_3$[10] | 7.8 | O | O | O |
| 26 | 28.6/71.4 | Cr$_2$O$_3$[30] | 16.2 | O | O | O |
| 27 | 28.6/71.4 | Cr$_2$O$_3$[50] | 25.5 | O | O | O |
| 28 | 28.6/71.4 | Cr$_2$O$_3$[70] | 31.2 | O | O | O |
| 29 | 28.6/71.4 | Cr$_2$O$_3$[90] | 38.4 | O | O | O |
| 30 | 28.6/71.4 | Cr$_2$O$_3$[95] | 42.0 | O | O | x |

As is clear from TABLE-9, in the case where the additional amount of $Cr_2O_3$ is below 3 percent by weight, the reaction layer is conspicuous. In the case where the additional amount of $Cr_2O_3$ exceeds 90 percent by weight, the sintering is difficult and the porosity is excessively large, which reduces the corrosion resistance.

EXAMPLE 6

Sample Nos. 31 to 39 were fabricated by changing the additional amount of $CeO_2$ of Sample No. 5 in various ways, and the heat and corrosion resistance thereof were measured in the similar manners. The measurement results are shown in TABLE-10.

TABLE 10

| Sample No. | Weight Ratio of MgO/Al$_2$O$_3$ | Addition [wt %] | Porosity [%] | Melting or Crack | Reaction Layer | Estimation |
|---|---|---|---|---|---|---|
| 31 | 28.6/71.4 | — | 0.0 | O | x | x |
| 32 | 28.6/71.4 | CeO$_2$[3] | 0.0 | O | O | O |
| 33 | 28.6/71.4 | CeO$_2$[5] | 0.0 | O | O | O |
| 34 | 28.6/71.4 | CeO$_2$[10] | 0.6 | O | O | O |
| 35 | 28.6/71.4 | CeO$_2$[30] | 2.3 | O | O | O |
| 36 | 28.6/71.4 | CeO$_2$[50] | 4.7 | O | O | O |
| 37 | 28.6/71.4 | CeO$_2$[70] | 7.3 | O | O | O |
| 38 | 28.6/71.4 | CeO$_2$[90] | 12.0 | O | O | O |
| 39 | 28.6/71.4 | CeO$_2$[95] | 15.9 | O | x | x |

As is clear from TABLE-10, in the case where the additional amount of $CeO_2$ is below 3 percent by weight, the reaction layer is conspicuous. In the case where the additional amount of $CeO_2$ exceeds 90 percent by weight, the sintering is difficult and the porosity is excessively large, which reduces the corrosion resistance.

EXAMPLE 7

Sample Nos. 40 to 48 were fabricated by changing the additional amount of $Cr_3O_2$ of Sample No. 12 in various ways, and the heat and corrosion resistance thereof were measured in the similar manners. The measurement results are shown in TABLE-11. As is clear from TABLE-11, in the case where the additional amount of $Cr_2O_3$ is below 3 percent by weight, the reaction layer is conspicuous. In the case where the additional amount of $Cr_2O_3$ exceeds 90 percent by weight, the sintering is difficult and the porosity is excessively large, which reduces the corrosion resistance.

TABLE 11

| Sample No. | Weight Ratio of MgO/Al$_2$O$_3$ | Addition [wt %] | Porosity [%] | Melting or Crack | Reaction Layer | Estimation |
|---|---|---|---|---|---|---|
| 40 | 25/75 | — | 0.1 | O | x | x |
| 41 | 25/75 | Cr$_2$O$_3$[3] | 0.5 | O | O | O |
| 42 | 25/75 | Cr$_2$O$_3$[5] | 2.4 | O | O | O |
| 43 | 25/75 | Cr$_2$O$_3$[10] | 8.8 | O | O | O |
| 44 | 25/75 | Cr$_2$O$_3$[30] | 19.9 | O | O | O |
| 45 | 25/75 | Cr$_2$O$_3$[50] | 24.6 | O | O | O |
| 46 | 25/75 | Cr$_2$O$_3$[70] | 29.1 | O | O | O |
| 47 | 25/75 | Cr$_2$O$_3$[90] | 38.4 | O | O | O |
| 48 | 25/75 | Cr$_2$O$_3$[95] | 45.2 | O | x | x |

EXAMPLE 8

Sample Nos. 49 to 57 were fabricated by changing the additional amount of $CeO_2$ of Sample No. 13 in various ways, and the heat and corrosion resistance thereof were measured in the similar manners. The measurement results are shown in TABLE-12. As is clear from TABLE-12, in the case where the additional amount of $CeO_2$ is below 3 percent by weight, the reaction layer is conspicuous. In the case where the additional amount of $CeO_2$ exceeds 90 percent by weight, the sintering is difficult and the porosity is excessively large, which reduces the corrosion resistance.

TABLE 12

| Sample No. | Weight Ratio of MgO/Al$_2$O$_3$ | Addition [wt %] | Porosity [%] | Melting or Crack | Reaction Layer | Estimation |
|---|---|---|---|---|---|---|
| 49 | 25/75 | — | 0.1 | O | x | x |
| 50 | 25/75 | CeO$_2$[3] | 0.0 | O | O | O |
| 51 | 25/75 | CeO$_2$[5] | 0.0 | O | O | O |
| 52 | 25/75 | CeO$_2$[10] | 0.4 | O | O | O |
| 53 | 25/75 | CeO$_2$[30] | 1.7 | O | O | O |
| 54 | 25/75 | CeO$_2$[50] | 3.2 | O | O | O |
| 55 | 25/75 | CeO$_2$[70] | 5.98 | O | O | O |
| 56 | 25/75 | CeO$_2$[90] | 11.2 | O | O | O |
| 57 | 25/75 | CeO$_2$[95] | 13.9 | O | x | x |

EXAMPLE 9

Sample Nos. 58 to 66 were fabricated by changing the additional amount of $Cr_2O_3$ of Sample No. 17 in various ways, and the heat and corrosion resistances thereof were measured in the similar manners. The measurement results are shown in TABLE-13. As is clear from TABLE-13, in the case where the additional amount of $Cr_2O_3$ is below 3 percent by weight, the reaction layer is conspicuous. In the case where the additional amount of $Cr_2O_3$ exceeds 90 percent by weight, the sintering is difficult and the porosity is excessively large, which reduces the corrosion resistance.

TABLE 13

| Sample No. | Weight Ratio of MgO/Al$_2$O$_3$ | Cr$_2$O$_3$ [wt %] | Porosity [%] | Melting or Crack | Reaction Layer | Estimation |
|---|---|---|---|---|---|---|
| 58 | 0/100 | — | 0.0 | O | x | x |
| 59 | 0/100 | Cr$_2$O$_3$[3] | 1.9 | O | O | O |
| 60 | 0/100 | Cr$_2$O$_3$[5] | 2.6 | O | O | O |
| 61 | 0/100 | Cr$_2$O$_3$[10] | 5.8 | O | O | O |
| 62 | 0/100 | Cr$_2$O$_3$[30] | 19.2 | O | O | O |
| 63 | 0/100 | Cr$_2$O$_3$[50] | 24.5 | O | O | O |
| 64 | 0/100 | Cr$_2$O$_3$[70] | 31.2 | O | O | O |
| 65 | 0/100 | Cr$_2$O$_3$[90] | 39.6 | O | O | O |
| 66 | 0/100 | Cr$_2$O$_3$[95] | 44.7 | O | x | x |

EXAMPLE 10

Sample Nos. 67 to 75 were fabricated by changing the additional amount of CeO$_2$ of Sample No. 18 in various ways, and the heat and corrosion resistances thereof were measured in the similar manners. The measurement results are shown in TABLE-14. As is clear from TABLE-14, in the case where the additional amount of CeO$_2$ is below 3 percent by weight, the reaction layer is conspicuous. In the case where the additional amount of CeO$_2$ exceeds 90 percent by weight, the sintering is difficult and the porosity is excessively large, which reduces the corrosion resistance.

TABLE 14

| Sample No. | Weight Ratio of MgO/Al$_2$O$_3$ | Addition [wt %] | Porosity [%] | Melting or Crack | Reaction Layer | Estimation |
|---|---|---|---|---|---|---|
| 67 | 0/100 | — | 0.0 | O | x | x |
| 68 | 0/100 | CeO$_2$[3] | 0.0 | O | O | O |
| 69 | 0/100 | CeO$_2$[5] | 0.0 | O | O | O |
| 70 | 0/100 | CeO$_2$[10] | 0.5 | O | O | O |
| 71 | 0/100 | CeO$_2$[30] | 1.4 | O | O | O |
| 72 | 0/100 | CeO$_2$[50] | 2.1 | O | O | O |
| 73 | 0/100 | CeO$_2$[70] | 4.8 | O | O | O |
| 74 | 0/100 | CeO$_2$[90] | 10.5 | O | O | O |
| 75 | 0/100 | CeO$_2$[95] | 12.1 | O | x | x |

EXAMPLE 11

Samples of furnace wall block were fabricated. Each sample is constructed by a dense sintered material member disposed on the inner side of coming into contact with slag, and a porous sintered material member disposed on the outer side of coming into no contact with slag. Each sample is in the shape of a trapezoidal prism, and has a height of 114 mm, a thickness of 230 mm, an inner width of 45 mm, and an outer width of 65 mm. The dense sintered material member disposed in the inner side has a thickness of 40 mm.

More specifically, Sample Nos. 76 to 81 were fabricated as shown in TABLE-15. In TABLE-15, the SiC brick contains 87 percent of SiC, 9 percent of SiO$_2$, 1 percent of Al$_2$O$_3$, and 3 percent of other components. The SiC brick has a porosity of 14 percent, a bulk specific gravity of 2.65, and a compression strength of 1200 kgf/cm$^2$. The carbon brick contains 80 percent of C, 10 percent of Al$_2$O$_3$, 5 percent of SiC, and 5 percent of other components. The carbon brick has a porosity of 18 percent, and a compression strength of 500 kgf/cm$^2$.

TABLE 15

| | Dense Sintered Material | | | Porous Sintered Material | |
|---|---|---|---|---|---|
| Sample No. | Weight Ratio of MgO/Al$_2$O$_3$ | Addition [wt %] | Porosity [%] | SiC or Carbon Brick | Porosity [%] |
| 76 | 0/100 | Cr$_2$O$_3$ [50] | 0.0 | SiC Brick | 14.0 |
| 77 | 28.6/71.4 | CeO$_2$ [50] | 0.0 | SiC Brick | 14.0 |
| 78 | 0/100 | Cr$_2$O$_3$ [50] | 0.0 | Carbon Brick | 18.0 |
| 79 | 28.6/71.4 | CeO$_2$ [50] | 0.0 | Carbon Brick | 18.0 |
| 80 | Si$_3$N$_4$ | | 0.0 | SiC Brick | 14.0 |
| 81 | Si$_3$N$_4$ | | 0.0 | Carbon Brick | 18.0 |

The estimation of thermal shock resistance and corrosion resistance was made according to the following method. Using a small-sized plasma furnace, incineration ash containing Al, Ca, Mg, Na, K, Si, Fe, Cl, etc. collected from an incinerator was heated at 1600 to 1700° C. in a reducing atmosphere (having an O$_2$ concentration of 3% or lower). The thus obtained molten slag was brought into contact with the slag contact surface of each sample for about 100 hours. The specific corrosion is defined as follows:
 a corrosion amount of the dense sintered material (mm)/
 a corrosion amount of the porous sintered material (mm).
The results are shown in TABLE-16.

TABLE 16

| Sample No. | Specific Corrosion | Shock Resistance | Corrosion Resistance | Estimation |
|---|---|---|---|---|
| 76 | 0.28 | ○ | ○ | ○ |
| 77 | 0.28 | ○ | ○ | ○ |
| 78 | 0.5 | ○ | ○ | ○ |
| 79 | 0.5 | ○ | ○ | ○ |
| 80 | — | ○ | x | x |
| 81 | — | ○ | x | x |

It can be seen from TABLE-15 and TABLE-16 that Sample Nos. 76 and 78, which is constructed by the inner member made of the dense sintered material including Al$_2$O$_3$ and 50 percent by weight of Cr$_2$O$_3$, and having the porosity of 0 percent, and the outer member made of the porous sintered material including SiC brick having the porosity of 14.0 percent or carbon brick having the porosity of 18.0 percent, are excellent in the thermal shock resistance and the corrosion resistance. Also, Sample Nos. 77 and 79, which is constructed with the inner member made of the dense sintered material including the polycrystalline substance of MgAl$_2$O$_4$ and 50 percent by weight of CeO$_2$, and having the porosity of 0 percent, and the outer member made of the porous sintered material including SiC brick having the porosity of 14.0 percent or carbon brick having the porosity of 18.0 percent, can be seen to be excellent in the thermal shock resistance and the corrosion resistance.

Sample Nos. 80 and 81 are excellent in the thermal shock resistance because of the combination of the dense sintered material and the porous sintered material, but are poor in the corrosion resistance because the inner member is made of Si$_3$N$_4$.

In the case of a high-temperature oxidizing atmosphere having an O$_2$ concentration of about 10% or higher, non-oxide materials such as SiC or carbon cannot be used in view of the oxidation problem. In such a case, the furnace wall block may be fabricated by combining an inner member made of an oxide dense sintered material such as $Al_2O_3$, $MgAl_2O_4$ and an outer member of a porous sintered material, such as alumina-chrome brick or like oxide brick. However, in the combination of a dense sintered material and a porous sintered material, the thermal shock resistance is reduced if the thickness of the inner member of a dense sintered material is excessive. This causes a danger of cracks. Accordingly, the thickness of the inner member of a dense sintered material is preferably 40 mm or smaller.

EXAMPLE 12

Assuming that a furnace material constituting a wall block for holding a heating member is melted inside an incineration ash melting furnace, and molten glass components from the furnace material are brought into contact with a heat resistive protecting member, a variety of ceramic materials were fabricated, and reaction tests of the fabricated ceramic materials with glass components was conducted.

First, a material containing Si, Ca, Na, Al, etc. as glass components was formed into tablets having a diameter of 12 mm, a thickness of 1 mm and a weight of 0.3 g by a dry pressure forming machine.

Subsequently, after tablet test pieces having a diameter of 30 mm and a thickness of 10 mm were made from various ceramics shown in TABLE-17 using the dry pressure forming machine, the fabricated test pieces were sintered in a proper atmosphere at temperatures above 1600° C. The respective test pieces were sintered after a cavity having a diameter of 13 mm and a depth of 1 mm for placing the glass tablets were formed therein. Accordingly, the contact surface of each test piece with the glass tablet is unworked. Characteristic values of the various ceramics were measured by the following methods.

Similarly to Examples 1 to 10, the crystal phase was analyzed by an X-ray diffraction apparatus under conditions of a voltage of 50 kV and a current of 200 mA set by using a copper tube and with a full scale of $3 \times 10^4$ $10 \times 10^4$ cps in a measurement range $2\theta(=10°$ to $90°)$. The crystal phases of $MgAl_2O_4$, $Al_2O_3$ and MgO are indicated at S, C, and P, respectively. Impurities were quantitatively analyzed for $SiO_2$, CaO, $Na_2O$ and $Fe_2O_3$ components and a total amount of these components was calculated. An SEM picture of a fracture plane with a magnifying power of 500 to 1000 was made, and the grain size was measured by the Code method using the obtained picture. The bulk specific gravity, porosity and flexural strength (3 points) were measured in accordance with the JIS methods.

In the reaction test, the glass tablets were placed in the cavity of the respective ceramic test pieces and a heat treatment was applied in the air at 1450° C. for 50 hours.

Thereafter, the outer appearance of the respective test pieces was observed by the eye and whether or not the test pieces had melted or cracked was checked. As for the cracks, the check was made by cutting the test piece, grinding the cut surface thereof and checking a SEM picture (with a magnifying power of about 50 to 200) of the ground surface. Using a dispersion type EPMA analyzer, the respective elements of Si, Ca, Na were detected at an acceleration voltage of 15 kV and a probe current of $2.0 \times 10^{-7}$A, and the detection results were outputted in a mapping format. Thereafter, the diffusion depths (reaction layers) of these elements were measured.

These results are shown in TABLE-17 and TABLE-18. In TABLE-18, the test pieces having cracks or being molten are indicated at x, and those having no crack and no molten part are indicated at O.

It can be seen from TABLE-17 and TABLE-18 that Sample Nos. 94, 95, and 96 not including $MgAl_2O_4$ and/or $Al_2O_3$, but including $ZrO_2$, SiC, $Si_3N_4$, respectively are unsuitable as material for the protecting member since they had melted or cracked. Also, Sample Nos 82 and 83 including not only $MgAl_2O_4$ but also MgO can be seen to be unsuitable as material for the protecting member since the thickness of their reaction layers is 0.4 mm or more.

Contrary to this, Sample Nos. 84 to 93 including Mg $Al_2O_4$ and/or $Al_2O_3$ but including no MgO had neither melted nor cracked, and had no reaction layer or a thin reaction layer. Accordingly, these materials can be seen to be useful for material for the protecting member without problems.

TABLE 17

| Sample No. | Composition MgO/$Al_2O_3$ [wt %] | Crystal Phase | Impurities [wt %] | Grain Size [μm] | Bulk Specific gravity | Porosity [%] | Flexural Strength [kgf/mm²] |
| --- | --- | --- | --- | --- | --- | --- | --- |
| 82 | 61/39 | S + P | 0.4 | 5 | 3.49 | 0.1 | 16 |
| 83 | 33/67 | S + P | 0.4 | 8 | 3.48 | 0.0 | 16 |
| 84 | 28.6/71.4 | S | 0.5 | 35 | 3.53 | 0.0 | 20 |
| 85 | 28/72 | S | 0.5 | 30 | 3.53 | 0.0 | 19 |
| 86 | 28/72 | S | 2.9 | 35 | 3.48 | 0.1 | 15 |
| 87 | 28/72 | S | 5.0 | 32 | 3.44 | 0.3 | 12 |
| 88 | 25/75 | S + C | 0.7 | 16 | 3.52 | 0.1 | 19 |
| 89 | 20/80 | S + C | 3.0 | 15 | 3.50 | 0.5 | 12 |
| 90 | 20/80 | S + C | 6.1 | 20 | 3.45 | 3.1 | 8 |
| 91 | 10/90 | S + C | 0.4 | 11 | 3.73 | 0.0 | 25 |
| 92 | 5/95 | S + C | 0.5 | 10 | 3.80 | 0.0 | 27 |
| 93 | 0/100 | C | 0.1 | 11 | 3.90 | 0.0 | 32 |
| 94 | $ZrO_2$ | — | 4 | 1 | 6.00 | 0.0 | 99 |
| 95 | α-SiC | — | 4 | 7 | 3.20 | 0.0 | 55 |
| 96 | $Si_3N_4$ | — | 10 | 5 | 3.20 | 0.0 | 60 |

TABLE 18

| Sample No. | Melting or Cracks | Reaction Layer |
| --- | --- | --- |
| 82 | o | 0.4 |
| 83 | o | 0.5 |
| 84 | o | 0.0 |
| 85 | o | 0.0 |
| 86 | o | 0.0 |
| 87 | o | 0.0 |
| 88 | o | 0.1 |
| 89 | o | 0.1 |
| 90 | o | 0.3 |
| 91 | o | 0.2 |
| 92 | o | 0.2 |
| 93 | o | 0.1 |
| 94 | x | — |
| 95 | x | — |
| 96 | x | — |

EXAMPLE 13

Ceramic test pieces respectively having the same composition as Sample Nos. 84 and 93 were used in this example. Three types of processing were applied to the surface of the respective ceramic test pieces that is brought into contact with the glass tablet: unworked surface (Sample No. 84-1, 93-1), ground surface (Sample No. 84-2, 93-2), and lapped surface (Sample No. 84-3, 93-3). In order to examine the relationship between the outer surface state of the ceramic test piece, the heat resistance, and the corrosion resistance, the respective test piece was thermally treated substantially in the same method as in EXAMPLE 12, and the presence of cracks and molten parts and the diffusion depth of Ca (reaction layer) were examined. The results are shown in TABLE-19.

In TABLE-19, none in the column "processing" means unworked surface after sintering without machining, grinding therein means the unworked surface is grounded about 0.3 mm by a diamond grindstone of the gage #140, and lapping therein means that, after the grinding of the unworked surface, rough machining was performed using GC abrasive grains having an average grain diameter of 10 μm on an alumina surface plate, and finishing machining was performed using diamond abrasive grains having an average grain diameter of 1 μm on a tin surface plate, thereby performing a total of about 50 μm of lapping. The test pieces were formed to have the same shape as EXAMPLE 12.

It can be seen from TABLE-19 that Sample Nos. 84-1 and 93-1 having the unworked outer surface state have thinnest reaction layer.

TABLE 19

| Sample No. | Processing | Surface Coarseness μm Ra | Melting/ Cracks | Reaction Layer |
| --- | --- | --- | --- | --- |
| 84-1 | Unworked | 3 | ○ | 0.0 |
| 84-2 | Grinding | 2 | ○ | 0.5 |
| 84-3 | Lapping | 0.3 | ○ | 0.4 |
| 93-1 | Unworked | 2 | ○ | 0.1 |
| 93-2 | Grinding | 1 | ○ | 0.7 |
| 93-3 | Lapping | 0.1 | ○ | 0.5 |

EXAMPLE 14

A comparison test of a protection tube provided with a protecting member made of the material of Sample No. 84-1 having the unworked outer surface and a protection tube provided with no protecting member was conducted. The material for both protection tubes was made of $MgAl_2O_4$. Also, both protection tubes had an outer diameter of 180 mm, an inner diameter of 160 mm, a thickness t of 10 mm, and a length of 800 mm. The shape of the both protection tubes and the protecting member is identical to those shown in FIG. 9. The both protection tubes were attached on an incineration ash melting furnace similar to that of FIG. 1. The life of the respective protection tubes at a temperature of 1500 ° C. was examined.

The life is a time until a current running in the heating member becomes zero after the protection tube is exposed to an actual environment and a crack or through hole or the like is formed in the protection tube by corrosion, thereby causing the heating member to fail.

As seen from TABLE-20 showing the results, the protection tube provided with the protecting member was proved to be usable over 4000 hours in the incineration ash melting furnace.

TABLE 20

| Material for Protection Tube | $MgAl_2O_4$ | $MgAl_2O_4$ |
| --- | --- | --- |
| Protecting member | Absent | Present |
| Protection Tube Life (hours) | About 2000 | about 4000 |

What is claimed:

1. A sintered material comprising a polycrystalline substance containing $MgAl_2O_4$ and 3 to 90 weight percent of $CeO_2$.

2. A sintered material as defined in claim 1, wherein the content of $CeO_2$ is 3 to 50 percent.

3. A furnace material made of a sintered material as defined in claim 1.

4. An article comprising:
    a protection tube made of a sintered polycrystalline substance of either $MgAl_2O_4$ or $Al_2O_3$ or both; and
    3 to 90 weight percent of $CeO_2$.

5. The article as defined in claim 4, wherein an end of the protection tube is closed.

6. A protecting member for use in a heat resisting protection tube, being made of a sintered material including a polycrystalline substance of $MgAl_2O_4$ and 3 to 90 weight percent of $CeO_2$.

7. A protecting member as defined in claim 6, wherein the protecting member has a sintered surface.

8. A furnace wall block comprising:
    an inner member having a surface to come into contact with molten matter, the inner member being made of a sintered material containing a polycrystalline substance of either $MgAl_2O_4$ or $Al_2O_3$ or both and 3 to 90 weight percent of either $Cr_2O_3$ or $CeO_2$ or both, the sintered material having a porosity of 3 percent or less; and
    an outer member separated from the molten matter by the inner member, the outer member being made of a porous sintered material having a porosity of 10 to 20 percent.

9. A furnace wall block as defined in claim 8, wherein the porosity rises gradually from the inner member to the outer member.

10. A furnace wall block as defined in claim 8, further comprising a stress relaxing layer between the inner member and the outer member.

11. A protection tube comprising:
    a main body having the shape of a tube and a closed end, and made of ceramics; and
    a protecting member provided on an inner surface of a portion of the main body including the closed end, the protecting member being made of a sintered material including a polycrystalline substance of either $MgAl_2O_4$ or $Al_2O_3$ or both and 3 to 90 weight percent of $CeO_2$.

12. A protection tube as defined in claim 11, wherein the protecting member has a sintered surface.

13. A protection tube as defined in claim 11, wherein the protecting member is detachable from the main body.

* * * * *